Nov. 24, 1942.  H. K. ISHLER  2,303,278
SHOCK ABSORBER FOR TENSIONED FILAMENTS
Filed Jan. 14, 1942
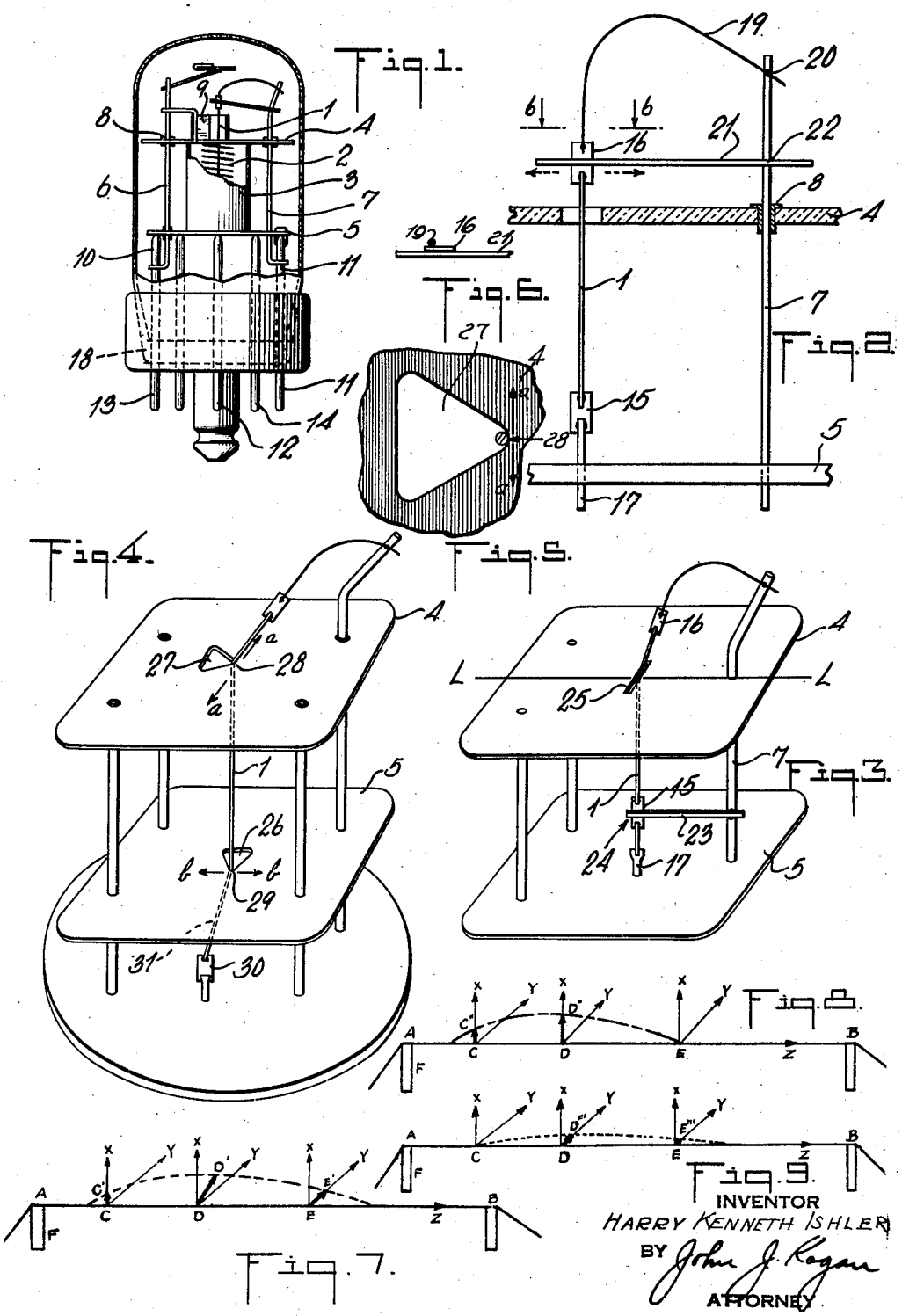
INVENTOR
HARRY KENNETH ISHLER
BY John J. Rogan
ATTORNEY Patented Nov. 24, 1942

2,303,278

UNITED STATES PATENT OFFICE 2,303,278

SHOCK ABSORBER FOR TENSIONED FILAMENTS

Harry Kenneth Ishler, Emporium, Pa., assignor to Sylvania Electric Products Inc., a corporation of Massachusetts Application January 14, 1942, Serial No. 426,696

15 Claims. (Cl. 250—27.5)

This invention refers to thermionic electron discharge devices, and in particular to electron tubes with heatable filaments.

Because of the expansion of the filament during heating, it is necessary to provide a spring to take up the slack that would otherwise develop if the filament were mounted at its ends on supports whose distance remains constant.

When the filament is heated during operation, because of its elasticity and because of the tension applied to its ends, it acts as an elastic or stretched string. Relative to the present invention the property of elastic strings under tension is a mechanical natural frequency, which is determined by its tension, thickness and mass according to well established mechanical laws. Such a member will be excited by any kind of shock, and the filament will continue oscillating at its natural frequency until its vibrating energy has been transferred into heat by damping.

Under the normal operating conditions of most electron tubes, the damping of the filament is exceedingly low. In the first place, there is no air damping in the vacuum, and when certain conditions are fulfilled, the viscosity of the filament in itself is low. Thus frictional forces are small, and a sustained mechanical vibration at a natural frequency occurs, which results in the well-known phenomenon called "microphonism," aggravated by the periodic change of plate current caused by the mechanical filament vibration.

Two methods are known for suppressing the microphonism of amplifier tubes using filamentary cathodes. The first entails the use of shock absorbers on the sockets and bases of the tubes, as well as on the chassis on which the tubes are mounted. These shock absorbers are applied externally to the tube. The second method entails the use of a damper at the filament itself. The damper consists of a piece of insulator or of insulated metal, which is attached to a nearby electrode and provides a frictional force acting against any motion of the filament. Usually the "damper" is applied near or at that part of the filament which would execute the largest amplitudes during mechanical vibration.

The method according to the invention provides a shock absorber, which differentiates from the known shock absorbers in that it is applied within the tube envelope. It is preferably applied in addition to one or another of the known filament dampers or displacers, and, if desired, in addition to other known shock-absorbing devices applied outside the tubes.

It is a principal object of the invention to provide a shock absorber inside a thermionic tube with a filamentary electrode, which absorber prevents any mechanical shock imparted to the tube from being transferred to the filamentary electrode.

Another object of the invention is to provide means for eliminating the development of standing waves (of the kind known as elastic transverse displacement waves) on a filamentary electrode, due to a mechanical displacement imparted to the electrode by electrical or mechanical stimuli.

A feature of the invention refers to the reduction of microphonism in thermionic amplifiers.

Another feature of the invention refers to an elastic filament suspension in an electron discharge tube, which is frictionally coupled to an auxiliary absorbing member.

It is another main object of the invention to provide means which insure a frictional damping of transverse filament oscillations for each and every plane of polarization in which an incipient oscillation may have been excited on any points between the active ends of the filament.

It is, generally speaking, the object of the invention to eliminate all resonance properties commonly associated with elastic strings, in particular those resonance properties which characterize the natural frequency in terms of the velocity of propagation of a transverse vibration on and along the length of the string. In this respect the invention differs intrinsically from all previously known methods for the reduction of microphonism. The latter are predicated upon one or the other only of two general principles. The first is a shock absorption, which prevents all mechanical transfer of shocks to the filament, the second consists in the application of a frictional force near or at a point of the filament at which the amplitude of the natural frequency of the filament is expected to be a maximum. Both means are only partly effective. The first, because a shock may be imparted to the filament by electrical means, e. g., a condenser discharge; the second, because the friction at the center of the filament merely reduces the dying out of the vibration. This frictional force must, in practice always be kept low.

There are two practical limitations for the application of an effective damping near the center of the hot filament. One is the lowering of the filament temperature resulting from contact with a heat conducting member. This contact must, therefore, be reduced to a very short length of the filament, so that the damping member will not substantially interfere with the thermionic emission over an appreciable length of the filament. Secondly, the pressure applied to the filament at the damping point, on the other and, must not exceed a certain value. If it does, the member will not act as a damper but will divide the filament in two lengths, whose ends are rigidly terminated, which terminations are characterized by perfect reflection of waves at the point of contact.

The idea of the invention may best be understood by the analogy with an electric wave transmission line which is terminated by a load whose value is equal to its own characteristic impedance. The new shock absorber represents exactly this sort of a termination of the string at least at one of its ends.

The adjustment of the friction at one or both filament supports is, therefore, determined by the mass and the elastic characteristics of the filament under operational conditions. If the frictional force at an end support is made equal to the wave resistance of the filament for transverse elastic waves, standing waves cannot develop, because the waves are not reflected at the end support.

The tension acts in the direction of the axis of the filament, while the freedom of motion for transversal vibrations is, of course, perpendicular to this direction.

For a better understanding of the invention, which involves the theory of the propagation of transversal waves on a string terminated by rigid supports, and by flexible and frictional supports, reference may be had to Figs. 7, 8 and 9, which give a semi-perspective view of a three dimensional rectangular coordinate system $x$, $y$, $z$, in which the rest position of a string is indicated in the $z$-axis by letters AFCDEGB. A and B indicate rigid end supports. Any deformation impressed on the string by external forces at a given instant will be propagated in both directions, $+z$ and $-z$, with velocity $+v$, and the shape of this deformation will be reflected back and forth indefinitely by the rigid end supports at both ends, thus forming two sets of travelling distortions moving along the string in opposite directions and proper phase relations, unless damping forces are present. Let the original deformation impressed by external forces at a certain instant have the form indicated in Fig. 7 by the curves C'D'E'.

The deflection of point C to C' is wholly in the $x$ direction, that of points E to E' wholly in the $y$ direction. The deflection of intermediate points has both $x$ and $y$ components, as e. g. D to D' in Fig. 7. A wave of this character is called unpolarized, which means that there is no preferred direction of the deformation in a single fixed plane going through the filament axis.

In accordance with physical laws, a wave of this type can always be decomposed into two component waves each of which is polarized in one of two planes at right angles to each other. The component of the wave polarized in the $xz$-plane is indicated in Fig. 8, the other component polarized in the $yz$-plane is indicated in Fig. 9.

If we apply now a damping member say in the $x$ direction, the only component that will be damped out is the polarization component of the original wave in the $xz$-plane shown in Fig. 8. The other component, polarized in the $yz$-plane is not damped out, but will go on being reflected at the end supports indefinitely.

In order to establish a damping of this second component, it is necessary to add a second damping member which offers friction in the $y$-direction, i. e. in a direction at right angles to the former damping member.

It is a further fact that the wave will not be reflected at all, if a frictional support replaces the rigid end support, and if the frictional force acting there has the value of the wave resistance which is determined by tension and mass per unit length of the string.

On the other hand, if the rigid end support is replaced by an elastic end support, the wave is not damped at all, it will be reflected just as much as if the end support were rigid. The only effect of the flexibility of the end support is a change in the natural frequencies of the string as compared to the natural frequencies for rigid supports. As is well known, the lowest natural frequencies are integer multiples of the fundamental frequency, corresponding to a wave length twice as long as the length of the string. The flexibility of the end supports acts as if the length of the string had been increased.

Therefore in order to insure complete damping of any wave being propagated on a string, it is necessary to apply damping members in two directions at right angles to each other and to the string or filament axis, and the value of the frictional force must be equal to the wave resistance which is determined by the tension and the mass per unit length of the string. In applying this knowledge to a filament of an electron discharge tube, it must also be kept in mind, that the frictional force can not be replaced by an elastic force acting on the end supports, and that the active frictional end support may be achieved by bending a filament over a substantially rigid guiding member through an angle which, together with the tension of the filament can be so chosen that a frictional force equal to the wave resistance is established.

The invention may be carried out in several ways in practice. The important criterion is, in all cases, to provide a free end of the filament in the direction perpendicular to its own longitudinal extension, and to apply a frictional bearing at this end, which produces a resistance against transverse motion substantially equal to the wave resistance of the filament under operating conditions.

Several embodiments of the invention will now be discussed in connection with the drawing in which Fig. 1 shows a complete radio tube embodying the invention.

Fig. 2 is a magnified view of part of the electrode mount of Fig. 1 showing one number of reducing the filament microphonism.

Fig. 3 shows a modification of Fig. 2.

Fig. 4 shows another modification of Fig. 2.

Fig. 5 is an enlarged view of one of the mica supports for the filament shown in Fig. 4.

Fig. 6 is a sectional view of Fig. 2 taken along the line 6—6 thereof.

Referring to Fig. 1 there is shown a typical radio tube embodying the invention. Merely for explanatory purposes, the tube is shown as of the triode type having a filamentary cathode 1, a control grid 2, and a plate or anode 3. The various electrodes are assembled between two mica spacer discs 4, 5, which are fastened to a pair of uprights 6, 7, by metal eyelets 8 to form a so-called unitary mount or electrode assembly. If desired, a small tubular metal shield 9 may surround the upper exposed end of filament 1 but in spaced relation thereto. The mount is supported by welding the right-angled ends of uprights 6, 7, to the respective rigid lead-in prongs 10, 11. If desired, the mount may also be supported by engagement between mica disc 5 and the upper ends of the various lead-in prongs. The prongs 11 and 12 for example may be connected to opposite ends of the filament. The prong 13 may be connected to the control grid 2, and prong 14 may be connected to the plate 3. It will be understood of course, that any other known construction of electrode assembly may be employed. The electrode assembly is enclosed within a bulb which is closed off at its lower end by a flattened glass header 18 through which the various rigid lead-in prongs are sealed.

Since the invention is concerned primarily with the manner of supporting the filament 1, reference will now be made to the enlarged view of Fig. 2 which omits all electrodes except the filament 1 which is welded to filament tabs 15 and 16 at its ends. The tab 15 is welded to a short metal strap 17 welded to lead wire 12 which passes through header 18. The other tab 16 is welded to tension spring 19 which is welded at point 20 to support rod 7. A rigid metal bar 21 welded at one end 22 to support rod 7 rests against tab 16 of filament 1 and offers friction to any motion of the filament in the direction of the dotted arrows. This friction should be adjusted, as explained above, to a value equal to the wave resistance of the filament under operating conditions, i. e., it should be equal to twice the square root of the product of the filament tension into the mass of the filament per unit length. This adjustment is easily determined by a few test runs, and can easily be maintained within practical tolerance-limits by appropriate mounting control.

Obviously, the friction acts only in the particular direction shown in Fig. 1, e. g., in the plane of the paper. An arbitrary transversal displacement of any point of the filament may, however, have any other direction perpendicular to the main extension of the filament. In other words, an incipient transversal oscillation of the filament may have polarized components in a plane perpendicular to the plane defined by the axis of the filament and the direction of bar 6, in addition to components in this plane.

The components of the oscillation in a direction perpendicular to this plane are, however, not damped out by the device according to Fig. 1, and, if necessary, additional means can be provided to offer friction to components of the motion in this direction. Such an arrangement is shown in Fig. 3. In Fig. 3, filament 1 is again welded to tabs 15 and 16. Tab 15 is attached to rod 7, tab 16 to tension spring 19 which, in turn, is welded to support rod 7 which passes through mica spacer 5. A friction bar 23 is provided at the lower end of the filament and bearing against tab 15, which prevents the reflection of any components of a transversal displacement wave of the filament at point 24 in the direction of bar 23. In order to prevent reflection of the components of the displacement waves perpendicular to the direction of bar 23, a frictional support is provided by slot 25 in top mica 4. As may be seen from Fig. 3, the slot allows a free motion of filament in a direction perpendicular to the plane of members 7 and 23, i. e., perpendicular to line L—L. The friction offered by the edge of the slot in the mica will, however, prevent a reflection of the components of the transverse displacement wave in the direction of the slot. It will be observed that the filament is tensioned so that it is held against one longitudinal edge of slot 25.

The combination of bar 23 at the bottom with the frictional end support offered by slot 25 in Fig. 3 will, therefore, prevent the setting up of standing transversal waves on the filament, independent of the direction of the plane of polarization of these waves. If desired, rod 7 may be an integral continuation of lead-in prong 11 which passes through header 18.

It is, of course, immaterial, as far as the invention is concerned, what particular kind of frictional end support is applied at the ends of the filament. Obviously, it is quite possible to provide two frictional bars 23 perpendicular to each other, one at each end of the filament, or to provide two frictional mica bearings at the two filament ends, disposed at right angles to each other.

Fig. 4 shows one embodiment of the invention, in which the two frictional filament end supports, which act in directions perpendicular to each other, are carried out in a practical way by means of triangular holes in the top and bottom micas 4 and 5. The two triangular holes 26 and 27 in mica supports 5 and 4 have rounded corners, as shown more clearly in enlarged Fig. 5. The radius rounding-off the corners of the triangular hole is several times larger than the diameter of filament 1, and the filament is, therefore, free to move (over short lengths) in the direction $a$—$a$ at the apex of triangular hole 27, substantially in the direction of the tangent at point 28 of the circle rounding off the corner at this apex of triangle 27.

The two holes 26 and 27 are so disposed in the micas 5 and 4 that the tangential directions at 28 i. e., $a$—$a$ and at 29 i. e., $b$—$b$, are perpendicular to each other and to the principal axis of the filament. The frictional end bearings, applied to the filament by this mutual position of the holes in the micas, together with the oblique direction of the tension applied to the filament as indicated in Fig. 4, will thus provide an effective prevention of the reflection of transversal mechanical waves polarized in any direction whatever. It will be observed that the holes in the micas are so disposed that point 28 is approximately in vertical alignment with point 29. The tab 30 is offset horizontally with respect to hole 26 so that the filament end 31 extends perpendicular to line $b$—$b$.

For practical purposes, it is not necessary that the directions $a$—$a$ at 28 and $b$—$b$ at 29 are disposed at right angles to each other, because due to the curvature of the corners, friction is offered not only for transversal displacements in the direction of the tangent at 28, but over a range of tangents at points in the neighborhood of 28. The same is, of course, true for the other mica at point 29.

This coverage of friction over a certain circular range thus increases with increasing amplitude of the undesired vibration, and the angular range at each bearing thus increases automatically as needed. Because of this automatic increase of the angular range of frictional efficiency, the tangential directions of two cooperating frictional end bearings may be disposed at an angle different from 90 degrees, if a curvature of the bearing periphery is provided similar to that explained in connection with Fig. 5.

Accordingly, it is within the compass of the invention to provide a pair of frictional end supports for a filamentary electrode, of a finite range of angular efficiency, in which the two supports are disposed at an angle to each other, which may be different from 90 degrees. Thus in the case of very small tubes the dimensions of the tube elements may be so small that not enough space is available for threading filamentary cathodes through the two micas, if the holes are disposed at right angles to each other.

While certain specific embodiments of the inventive subject matter have been illustrated, it will be understood that various changes and modifications may be made therein without departing from the spirit and scope of the invention.

What I claim is:

1. In combination, a filamentary member, means to maintain said member under tension, and means to counteract the development on said member of standing waves of the elastic transverse displacement type when said member is subjected to shock excitation, and comprising means to apply frictional damping to opposite ends of the filament in mutually perpendicular directions.

2. In combination, a heatable filament, means to maintain said filament under tension, and means to counteract the development of microphonism when said filament is subjected to shock, the last-mentioned means including a shock absorber frictionally coupled to said filament adjacent an end thereof, and another shock absorber frictionally coupled to said filament adjacent the opposite end thereof, said shock absorbers applying frictional forces in mutually perpendicular relations with respect to the length of the filament.

3. In combination, a filamentary member having an active length intermediate the ends thereof, means to maintain said member under tension, and means to damp transverse oscillations of said filament for substantially all planes of polarization in which the filament is shocked at any point of its active length, and including friction means adjacent opposite ends of the filament for applying frictional forces thereto acting in mutually perpendicular relations with respect to the length of the filament.

4. In combination, a heatable filament, means to maintain said filament under tension, and means adjacent the opposite end sections of the filament to provide frictional forces at said opposite end sections to damp transverse filament oscillation in mutually perpendicular planes.

5. The combination according to claim 2 in which said shock absorbers each comprises a substantially rigid member extending substantially transverse to the length of the filament, and frictionally coupled thereto to provide frictional forces transverse to the length of the filament.

6. The combination according to claim 4 in which said damping means comprises a pair of members extending substantially perpendicular to the filament length and each coupled frictionally thereto.

7. In combination a heatable filament, means to maintain the filament under tension, means frictionally coupled to the filament adjacent one end to damp vibrations in one direction perpendicular to the filament axis without interfering with the free expansion and contraction of the filament, and means frictionally coupled to the filament adjacent the opposite end, to damp out vibrations perpendicular to both the filament axis and to said one direction.

8. The combination according to claim 7 in which the damping means comprises a pair of members having substantially rigid edges extending transversely to each other and frictionally engaging the filament so that the line of action of the frictional forces at one end of the filament is transverse to the line of action of the frictional forces at the other end of the filament.

9. The combination according to claim 7 in which the damping means comprises a pair of members having substantially rigid edges extending transversely to each other and frictionally engaging the filament, and said tension means exerts a component of force holding said filament against said edge.

10. The combination according to claim 7 in which the damping means comprises a pair of rigid rods extending transversely to the filament but in different planes and frictionally engaging opposite ends of the filament.

11. The combination according to claim 2 in which the frictional coupling is adjusted to equal approximately $2\sqrt{t.m.}$ where $t$ is the filament tension and $m$ is the filament mass per unit length.

12. The combination according to claim 7 in which the damping means comprises a substantially rigid rod frictionally coupled to the filament adjacent one end, and a disc having a slot adjacent the opposite end of the filament and through which the filament passes, said slot extending in a different direction from said rod.

13. The combination according to claim 7 in which the damping means comprises a pair of discs mounted adjacent the end sections of the filament and each having a perforation through which the filament passes, and said tensioning means maintains the filament against an edge of each perforation.

14. The combination according to claim 7 in which the damping means comprises a pair of discs mounted adjacent the end sections of the filament and each having a perforation with a rounded corner and through which the filament passes, and said tensioning means maintains the filament against the edge of said corner.

15. The combination according to claim 7 in which the damping means comprises a pair of discs mounted adjacent the end sections of the filament and each having a rounded notch, the opening angle of one notch being substantially transverse to the opening angle of the other notch, and said tensioning means maintains the filament against the rounded edge of each notch.

HARRY KENNETH ISHLER.